United States Patent
Benhase et al.

(10) Patent No.: US 8,972,661 B2
(45) Date of Patent: *Mar. 3, 2015

(54) DYNAMICALLY ADJUSTED THRESHOLD FOR POPULATION OF SECONDARY CACHE

(75) Inventors: Michael T. Benhase, Tucson, AZ (US); Stephen L. Blinick, Tucson, AZ (US); Evangelos S. Eleftheriou, Rueschlikon (CH); Lokesh M. Gupta, Tucson, AZ (US); Robert Haas, Adliswil (CH); Xiao-Yu Hu, Horgen (CH); Ioannis Koltsidas, Zurich (CH); Roman A. Pletka, Uster (CH)

(73) Assignee: International Business Machines Corporation, Armonk, NY (US)

( * ) Notice: Subject to any disclaimer, the term of this patent is extended or adjusted under 35 U.S.C. 154(b) by 734 days.

This patent is subject to a terminal disclaimer.

(21) Appl. No.: 13/285,740

(22) Filed: Oct. 31, 2011

(65) Prior Publication Data
US 2013/0111133 A1    May 2, 2013

(51) Int. Cl.
*G06F 12/08* (2006.01)

(52) U.S. Cl.
CPC ........ *G06F 12/0888* (2013.01); *G06F 12/0897* (2013.01); *G06F 2212/225* (2013.01); *G06F 12/0866* (2013.01)
USPC .................. 711/122; 711/138; 711/E12.043; 711/E12.021

(58) Field of Classification Search
None
See application file for complete search history.

(56) References Cited

U.S. PATENT DOCUMENTS

| | | | |
|---|---|---|---|
| 5,293,608 A | 3/1994 | Johnson et al. | |
| 6,507,893 B2 * | 1/2003 | Dawkins et al. | 711/133 |
| 8,255,624 B2 * | 8/2012 | Fujii et al. | 711/113 |
| 2008/0059707 A1 * | 3/2008 | Makineni et al. | 711/122 |
| 2008/0114930 A1 * | 5/2008 | Sanvido et al. | 711/113 |
| 2008/0235457 A1 * | 9/2008 | Hasenplaugh et al. | 711/130 |
| 2008/0282059 A1 | 11/2008 | Ekanadham et al. | |
| 2009/0144506 A1 | 6/2009 | Barth, Jr. et al. | |

(Continued)

FOREIGN PATENT DOCUMENTS

| | | |
|---|---|---|
| JP | 2004355365 A | 12/2004 |
| JP | 2011204060 A | 10/2011 |
| WO | WO2011/078014 A1 | 6/2011 |

OTHER PUBLICATIONS

Johnson et al. "Run-time Adaptive Cache Hierarchy Management via Reference Analysis." Jun. 1997. ACM. ISCA '97. pp. 315-326.*

(Continued)

*Primary Examiner* — Nathan Sadler
(74) *Attorney, Agent, or Firm* — John H. Holcombe

(57) ABSTRACT

The population of data to be inserted into secondary data storage cache is controlled by determining a heat metric of candidate data; adjusting a heat metric threshold; rejecting candidate data provided to the secondary data storage cache whose heat metric is less than the threshold; and admitting candidate data whose heat metric is equal to or greater than the heat metric threshold. The adjustment of the heat metric threshold is determined by comparing a reference metric related to hits of data most recently inserted into the secondary data storage cache, to a reference metric related to hits of data most recently evicted from the secondary data storage cache; if the most recently inserted reference metric is greater than the most recently evicted reference metric, decrementing the threshold; and if the most recently inserted reference metric is less than the most recently evicted reference metric, incrementing the threshold.

13 Claims, 3 Drawing Sheets

(56) References Cited

U.S. PATENT DOCUMENTS

| | | |
|---|---|---|
| 2010/0023682 A1 | 1/2010 | Lee et al. |
| 2010/0030970 A1* | 2/2010 | Qureshi .................. 711/128 |
| 2010/0199021 A1 | 8/2010 | Harper et al. |
| 2011/0055458 A1 | 3/2011 | Kuehne |
| 2011/0082965 A1 | 4/2011 | Koka et al. |
| 2011/0087837 A1 | 4/2011 | Blinick et al. |
| 2011/0145479 A1 | 6/2011 | Talagala et al. |
| 2011/0238908 A1* | 9/2011 | Kurita .................. 711/113 |
| 2012/0124291 A1* | 5/2012 | Achilles et al. .............. 711/122 |
| 2013/0111131 A1* | 5/2013 | Benhase et al. .............. 711/118 |
| 2013/0111133 A1* | 5/2013 | Benhase et al. .............. 711/122 |
| 2013/0111146 A1* | 5/2013 | Ash et al. .................... 711/136 |

OTHER PUBLICATIONS

Jalminger et al. "A cache block reuse prediction scheme." May 2004. Elsevier. Microprocessors and Microsystems. vol. 28. pp. 373-385.*

Qureshi et al. "A Case for MLP-Aware Cache Replacement." Jun. 2006. IEEE. ISCA '06.*

Dybdahl et al. "An LRU-based Replacement Algorithm Augmented with Frequency of Access in Shared Chip-Multiprocessor Caches." Sep. 2006. ACM. Medea '06. ACM Sigarch Computer Architecture News. vol. 35. pp. 45-52.*

Qureshi et al. "Adaptive Insertion Policies for High Performance Caching." Jun. 2007. ACM. ISCA '07. pp. 381-391.*

Xiang et al. "Less Reused Filter: Improving L2 Cache Performance via Filtering Less Reused Lines." Jun. 2009. ACM. ICS '09. pp. 68-79.*

Gao et al. "A Dueling Segmented LRU Replacement Algorithm with Adaptive Bypassing." Jun. 2010. http://hal.archives-ouvertes.fr/docs/00/49/29/65/PDF/005_gao.pdf.*

Duong et al. "SCORE: A Score-Based Memory Cache Replacement Policy." Jun. 2010. http://www.jilp.org/jwac-1/online/papers/004_duong.pdf.*

Gaur et al. "Bypass and Insertion Algorithms for Exclusive Last-level Caches." Jun. 2011. ACM. ISCA '11. pp. 81-92.*

* cited by examiner

US 8,972,661 B2

DYNAMICALLY ADJUSTED THRESHOLD FOR POPULATION OF SECONDARY CACHE

FIELD OF THE INVENTION

This invention relates to computer-implemented data storage caches, and more particularly to caches having multiple levels.

BACKGROUND OF THE INVENTION

Computer-implemented data storage systems typically comprise various types of data storage in which data is stored on behalf of host computer systems. Storage controls or controllers control access to data storage media and memories in response to read and write requests. The storage controls may direct the data in accordance with data storage devices such as cache, non-volatile storage, RAID (redundant array of independent disks), JBOD (just a bunch of disks), etc. arranged into various redundancy, access speed and security levels.

As an example, an International Business Machines Corp. (IBM®) ESS (Enterprise Storage Server) data storage system such as a DS8000™ has redundant clusters of computer entities, cache, non-volatile storage, etc., called "central electronics complexes" or "CECs".

Within a data storage system, a cache comprises a fast memory or storage device used to store data or instructions that were accessed recently, are accessed frequently, or are likely to be accessed in the near future. Data stored in cache can be accessed quickly instead of being fetched or recomputed, saving both time and resources.

Cache can be provided in multiple levels. For example, a cache data storage system may comprise both a "first" or "primary" cache and a "secondary" cache. Typically, the first cache has faster access and is more costly per unit of data than a secondary cache, and the secondary cache has greater storage capacity than the first cache. For example, a first cache comprises dynamic random access memory (DRAM), while the secondary cache comprises flash memory solid-state drives (SSD) such as "Flash_Cache" (TM International Business Corp.). When accessing data, a computing system or device may first look for data in the first cache and, if the data is not present there, look for the data in the secondary cache. When writing data, a computing system or device may write data to the first cache. If data in the first cache is not accessed promptly or frequently, this data may be demoted to the secondary cache. If data is not accessed promptly or frequently from the secondary cache, it may be evicted to slower access speed data storage such as RAID, JBOD, etc.

Typically, a LRU (least recently used) algorithm is employed to select which data to demote to the next lower level.

SUMMARY OF THE INVENTION

Computer-implemented cache data storage systems, and computer program products are provided for controlling population of data into secondary data storage cache. "Secondary" in this context is any level of data storage cache between a first level of data storage cache and other data storage. Thus, in a tri-level data storage cache, "secondary" data storage cache may be the second level or the third level.

In one embodiment of a computer-implemented cache data storage system comprising a secondary data storage cache, the following is performed:

determining a heat metric of candidate data to be inserted into the secondary data storage cache;

adjusting a heat metric threshold in accordance with caching efficiency of a present state of the secondary data storage cache;

rejecting candidate data provided to the secondary data storage cache whose heat metric is less than the threshold; and admitting to the secondary data storage cache, candidate data provided to the secondary data storage cache whose heat metric is equal to or greater than the heat metric threshold.

In a further embodiment, the caching efficiency is determined by:

maintaining a reference metric related to hits of data most recently inserted into the secondary data storage cache;

maintaining a reference metric related to hits of data most recently evicted from the secondary data storage cache; and the adjusting step comprises adjusting the heat metric threshold in accordance with the reference metric of the most recently inserted data and the reference metric of the most recently evicted data.

In a still further embodiment, the adjusting step comprises:

comparing the reference metric of the most recently inserted data to the reference metric of the most recently evicted data;

if the most recently inserted reference metric is greater than the most recently evicted reference metric, decrementing the threshold; and if the most recently inserted reference metric is less than the most recently evicted reference metric, incrementing the threshold.

In another embodiment, wherein the cache data storage system additionally comprises a first data storage cache, the heat metric is based on the heat of the data while the data was stored in the first data storage cache of the cache data storage system.

In a further embodiment, the data provided to the secondary data storage cache comprises data demoted from the first data storage cache.

In another embodiment, the most recently inserted data is listed in an MRI list and the most recently evicted data is listed in an MRE list, and the reference metric comprises counting hits in the secondary data storage cache for the data listed in the MRI while the data is in the secondary data storage cache and hits for the data in the MRE after the data has been evicted from the secondary data storage cache.

In a further embodiment, wherein the data comprise pages of data, counting hits for the heat metric is determined on a per page basis, and the most recently inserted and the most recently evicted reference metrics are determined for all of the pages listed respectively in the MRI and the MRE.

In another embodiment, the adjusting step additionally comprises, if the most recently inserted reference metric and the most recently evicted reference metric are substantially the same, the heat metric threshold is left unchanged.

In a further embodiment, the first data storage cache comprises a DRAM first cache providing data to the secondary cache and the secondary cache comprises a flash memory.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
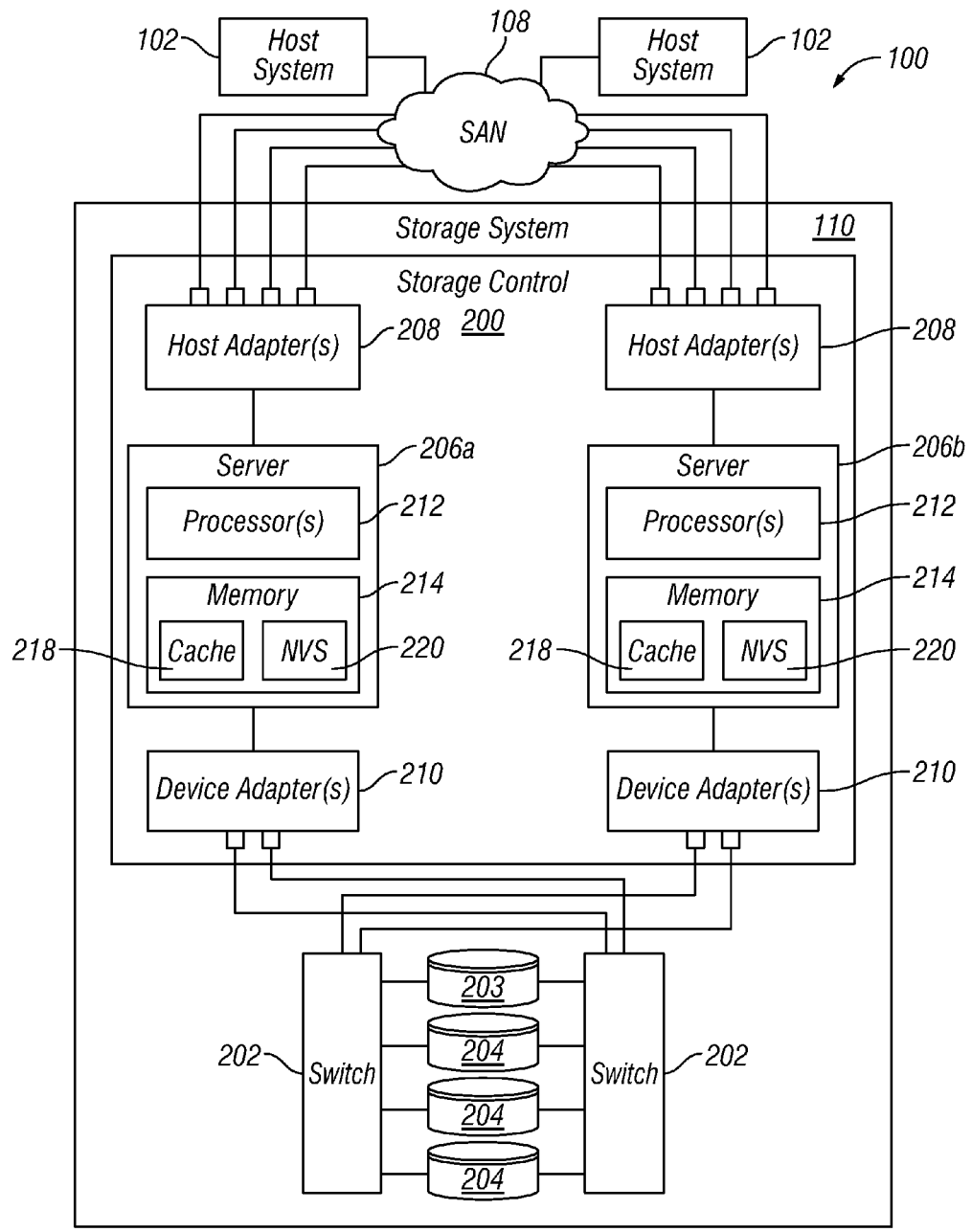
FIG. 1 is a block diagram of an exemplary network and computer-implemented storage server system in which the present invention may be implemented.

Referring to FIG. 1, an example of computer-based network architecture 100 is illustrated with a computer-implemented data storage system 110 which may implement a computer-implemented cache data storage system and methods discussed herein. The architecture 100 is presented only by way of example and is not intended to be limiting. The computer-implemented cache data storage system and methods disclosed herein may be applicable to a wide variety of different computers, servers, data storage systems, and network architectures.

The exemplary network architecture 100 may comprise one or more host computer systems 102 coupled to a network, such as a storage area network (SAN) 108. The network 108 may comprise any suitable private or public interconnection using any suitable protocol.

The storage system 110 comprises a storage control 200 configured to transfer data to and from and to control the operation of switches 202 and data storage 203 and 204. The data storage may comprise, for example, arrays of solid-state drives and hard disk drives accessible via switches 202. Alternatively or additionally, the data storage 203 and 204 may comprise individual devices or may comprise data storage libraries with many devices. All or any of the host systems 102 may direct and utilize the storage system 110 and utilize the storage control 200 and data caching system herein.

The caching system may be implemented within a storage control 200 and may also be applicable to other storage systems. As shown, the storage control 200 comprises one or more servers 206. The control 200 may also comprise host adapters 208 and device adapters 210 to provide the interfaces to connect the control 200 to host systems 102 and data storage 203 and 204, respectively. Multiple servers 206a, 206b may provide redundancy to ensure that data is always available to connected hosts 102. Thus, should one server 206a fail, the other server 206b may remain functional to ensure that data transfer is able to continue between the host systems 102 and the data storage 203 and 204. This process may be referred to as "failover".

One example of a storage system 110 having an architecture similar to that illustrated in FIG. 1 is the DS8000™ Enterprise Storage Server of International Business Machines Corp. (IBM®). The DS8000™ is a high performance, high capacity storage control providing data storage that is designed to support continuous operations and implement virtualization of data storage, and is presented herein only by way of embodiment examples and is not intended to be limiting. Thus, the caching system discussed herein is not limited to the DS8000™, but may be implemented in any comparable storage control 200 having caching, regardless of the manufacturer, product name, or components or component names associated with the system 110.

In the example of FIG. 1, each server 206 may comprise one or more computer processors 212 and memory 214. The computer processors 212 may comprise internal processing and storage capabilities to store software modules that run on the processors and, inter alia, are used to access data in the data storage 203 and 204.

In one embodiment, the memory 214 may comprise a cache 218. Whenever a host 102 accesses data from the storage system 110, for example in a read operation, the server 206 that performs the operation, for example reading data from storage 204, may save the data in its cache 218 in the event is may be required again. If the data is accessed again by a host 102, the server 206 may fetch the data from the cache 218 instead of fetching it from storage 204, saving both time and resources. Similarly, when a host system 102 performs a write, the server 206 may store, or host system 102 may direct that the data be stored, in cache 218 to be destaged to the storage 204 at a later time. When a write is stored in cache 218, the write may also be stored in non-volatile storage (NVS) 220 of the opposite server 206 so that the write can be recovered by the opposite server 206 in the event the first server 206 fails.

Figure 2:
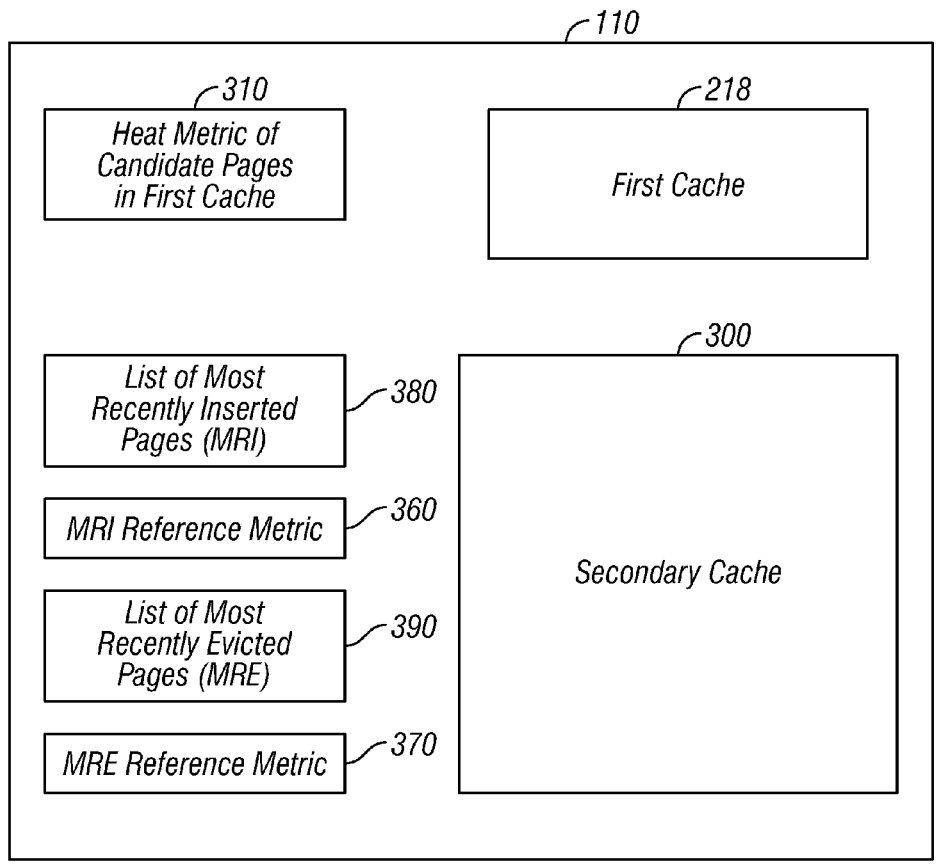
FIG. 2 is a diagrammatic illustration of a computer-implemented cache data storage system of FIG. 1.

Referring to FIGS. 1 and 2, a storage system 110 may comprise both data storage 204, such as hard disk drives, and data storage 203, such as solid state drives (SSDs) based on non-volatile memory such as flash memory. The input/output (I/O) performance of SSD drives or other types of solid state memory is typically far faster than the I/O performance of hard disk drives. Because of the higher I/O performance, the SSDs 203 may, in certain embodiments, be used to provide a large secondary cache 300 between the cache 218, serving as a first cache, and the hard disk drives 204. The use of a large secondary cache 300 may significantly improve the I/O performance of the storage system 110.

Using the secondary cache 300 if a read request is received by a server 206, the server may initially look for data in the first cache 218 and, if the data is not present, look for the data in the secondary cache 300 residing in the SSDs 203. If the data is not available in either cache, the server 206 may retrieve the data from the hard disk drives 204. Similarly, when writing or modifying data, a server 206 may initially write the data or modified data to the first cache 218. The data may eventually be destaged to the secondary cache 300 to make room in the first cache 218. This data may ultimately be destaged to the disk drives 204 to make space available in the secondary cache 300.

When data is read from hard disk drives 204, it may also be stored in the first cache 218 in case it will be accessed again.

As an example, the secondary cache 300 may be sized to provide about one to twenty percent of the total data storage capacity of the storage system 110. Thus, for a storage system 110 that comprises about 40 terabytes of data storage (from both hard disk drives 204 and SSDs 203), about 2 terabytes of this storage space may be used as a secondary cache 300. The first cache 218 is typically a small percentage of the size of the secondary cache 300. As an exemplary embodiment, the storage space for both the first cache 218 and the secondary cache 300 may be arranged in pages to provide ease of handling.

Figure 3:
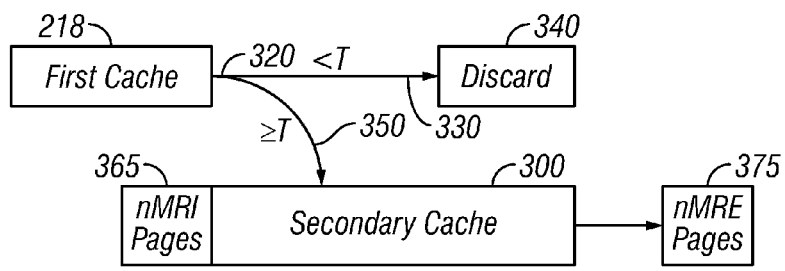
FIG. 3 is a diagrammatic illustration of various states of the system of FIGS. 1 and 2.
Figure 4:
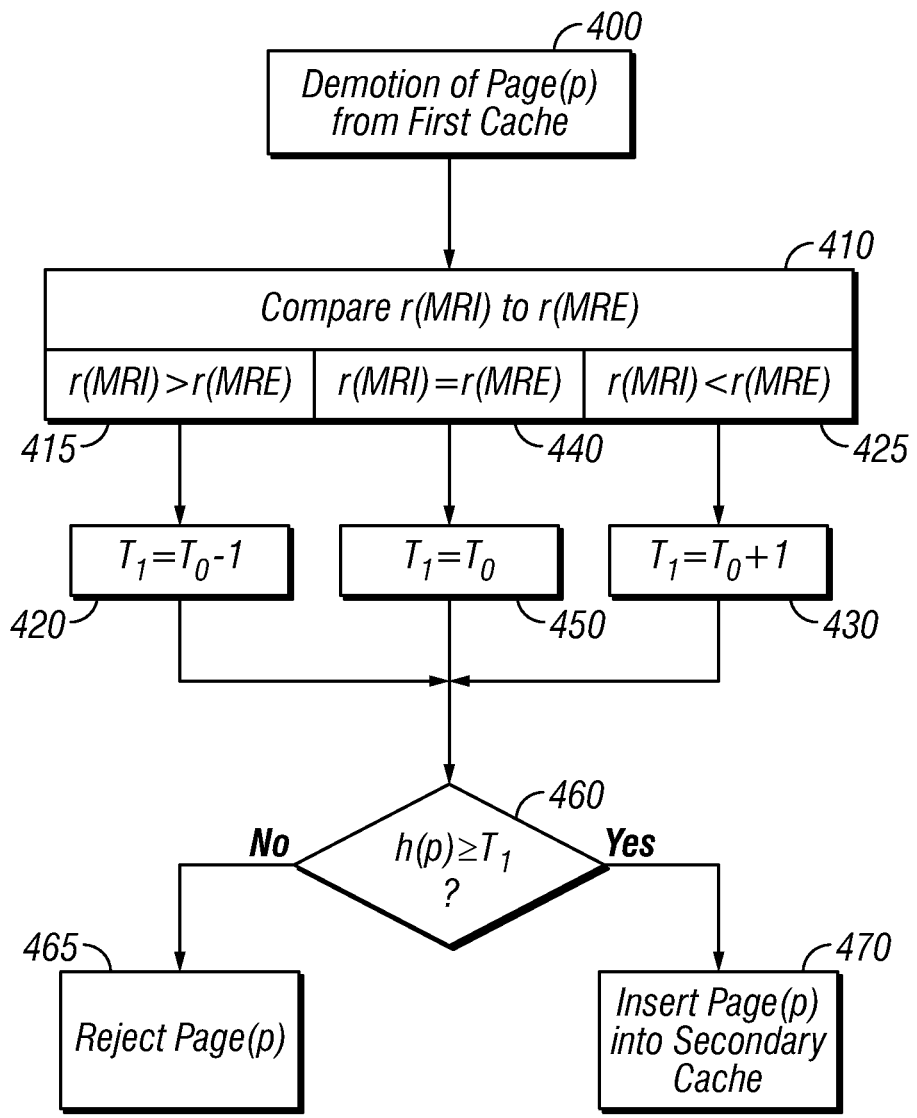
FIG. 4 is a flow chart depicting an exemplary method of operating the system of FIGS. 1 and 2.

Referring to FIGS. 2, 3 and 4, in one embodiment, a dynamically adjusted threshold is applied to provide selective population of the secondary cache 300.

In an embodiment in which the threshold is employed to filter data demoted from the first cache 218, the adjustment of the threshold is accomplished by maintaining statistics on only pages cached in the first cache 218 and a small proportion of the secondary cache 300.

The statistics maintained by the control 200 comprise heat metrics 310 of pages in the first cache 218 that are candidates to be demoted to the secondary cache 300.

One example of a heat metric is a count of the number of times that the page of data has been accessed ("hit") since it has been located in the first cache 218. Since most caches determine which data to demote based on a least recently used (LRU) algorithm (of which many types are known to those of skill in the art), an efficient way of gathering the statistics is to track and maintain the heat metric of all pages in the first cache 218. The number of hits can be implemented in the form of a counter in the metadata entry for each page in the first cache 218, for example.

Other examples of heat metrics comprise a number of "hits" of a page over a limited period of time while the page has been located in the first cache 218, and a ratio of "hits" to a page compared to an average of "hits" to all pages in the first cache 218.

In one embodiment, the heat metric and the candidate data is only data that has been copied from storage 204, for example in a read operation.

In FIG. 3, the adjustable threshold T is in the form of a heat metric. The heat metric threshold T is adjusted in accordance with caching efficiency of a present state of the secondary data storage cache 300. The control 200 of FIG. 1 compares the heat metric 310 of FIG. 2 of a candidate page to be demoted 320 to the heat metric threshold T. The control rejects 330 the candidate data provided to the secondary data storage cache if the heat metric 310 of the candidate data is less than the threshold T. In one example, the rejected data 330 is discarded 340. Discarding means that reference to the data, if it has been copied from storage 204 of FIG. 1, is removed from storage 218 and metadata (such as an index) of the first storage 218, and the original copy is maintained in storage 204.

If, instead, the candidate data 320 includes data that has been initially written to the first cache 218, discarding means that the data is written to data storage 204 of FIG. 1.

Still referring to FIG. 3, the control 200 of FIG. 1 admits 350 to the secondary data storage cache 300, candidate data 320 provided to the secondary data storage cache 300 whose heat metric 310 of FIG. 2 is equal to or greater than the heat metric threshold T.

Referring to FIGS. 2 and 3, in one embodiment, the caching efficiency adjustment to the heat metric threshold T maintained by the control 200 of FIG. 1 is based upon maintaining a reference metric 360 related to hits of data most recently inserted (MRI) 365 into the secondary data storage cache 300 and maintaining a reference metric 370 related to hits of data most recently evicted (MRE) 375 from the secondary data storage cache 300. In one embodiment, the number of pages of data employed in the MRI and MRE reference metrics are equal. As one example, the most recently inserted data 365 is listed in an MRI list 380 and the most recently evicted data is listed in an MRE list 390, and the reference metric comprises counting hits in the secondary data storage cache for the data listed in the MRI while the data is in the secondary data storage cache 300 and hits for the data listed in the MRE after the data has been evicted from the secondary data storage cache. The lists 380, 390 may be in the form of small ghost cache that uses a first-in first-out replacement policy. Alternatively, the lists may be determined by adding and deleting each page identification as it is moved into, within and out of the secondary cache. At each page reference the control updates the two lists, keeping track of the number of hits occurring in the MRI list "r(MRI)", and the MRE list "r(MRE)".

In a further embodiment, wherein the data comprise pages of data, counting hits for the heat metric 310 is determined on a per page basis, in one example the number of hits for a page while that page is in the first cache 218. On the other hand, the most recently inserted and the most recently evicted reference metrics 360, 370 are determined for all of the pages listed respectively in the MRI 365 and the MRE 375.

In one embodiment, the control 200 of FIG. 1 compares the reference metric 360 of the most recently inserted data to the reference metric 370 of the most recently evicted data; and if the most recently inserted reference metric 360 is greater than the most recently evicted reference metric 370, decrements the threshold T; and if the most recently inserted reference metric 360 is less than the most recently evicted reference metric 370, increments the threshold.

Referring to FIGS. 2, 3 and 4, in one embodiment, the control 200 of FIG. 1, in step 400, demotes a page p from first cache 218.

In step 410, which may occur in a time frame unrelated to step 400, compares the reference metric 360 of the most recently inserted data 365 of secondary cache 300 to the reference metric 370 of the most recently evicted data 375.

In one embodiment, at the steady state, for each page admitted into the secondary cache 300, one page has to be evicted. That is, each admission implies one page replacement. Thus, at each first cache demotion, the control will evaluate the n latest secondary cache admission decisions: if these were right (i.e. resulted in an increased hit ratio), then the threshold T will be decremented. Specifically, if the most recently inserted reference metric 360 is greater 415 than the most recently evicted reference metric 370, the threshold T will be decremented 420. That is, the previous threshold $T_0$ is decremented by one unit of measure to become the new threshold $T_1$. In one example, the adjustment for $T_1$ allows a page with one less hit to be admitted to the cache. The lower threshold will result in more aggressive secondary cache population.

On the other hand, if the n latest secondary cache admission decisions were wrong, (i.e. resulted in a reduced hit ratio), then the threshold T will be increased. Specifically, if the most recently inserted reference metric 360 is less 425 than the most recently evicted reference metric 370, the threshold T will be increased 430. That is, the previous threshold $T_0$ is increased by one unit of measure to become the new threshold $T_1$. In one example, the adjustment for $T_1$ allows only a page with one greater number of hits to be admitted to the cache. The higher threshold will result in discarding 340 more incoming pages.

In one embodiment, an alternative steady state may be maintained where, if the most recently inserted reference metric 360 and the most recently evicted reference metric 370 are substantially the same 440, the heat metric threshold T is left unchanged 450.

As an alternative, the adjustment of threshold T may be conducted at specific time periods.

As the result, if r(MRI)>r(MRE), it means that the newly admitted pages are hotter than the evicted ones and the threshold T should be lower. On the other hand if r(MRI)<r(MRE), it means that the evicted pages were more valuable to the host system 102 than the newly admitted ones and should not have been replaced by the new ones; thus, the population rate should be lower and the admission threshold T should be higher.

In one embodiment, in step 460, the heat 310 of the demoted page 320 "h(p)" is compared to the new threshold $T_1$. The control rejects 465, 330 the candidate data 320 provided to the secondary data storage cache if the heat metric 310 of the candidate data is less than the threshold T, for example discarding 340 the rejected data. The control 200 of FIG. 1 admits 470, 350 to the secondary data storage cache 300, candidate data 320 provided to the secondary data storage cache 300 whose heat metric 310 is equal to or greater than the heat metric threshold T.

As examples of the adjustment to the threshold T, if during the last 1000 accesses, there have been 50 hits in the MRE list (on any of its pages) and only 10 hits in the MRI list (on any of its pages), it means that pages of more caching value are being evicted from the secondary cache to insert new ones of less caching value, and thus the control should reduce the admission rate (raise the threshold T) to the secondary cache 300. Conversely, if during the last 1000 accesses, there have been 50 hits in the MRI list (on any of its pages) and only 10 hits in the MRE list (on any of its pages), it means that new pages of more caching value are being inserted into the secondary cache and ones of less caching value are being evicted, and thus the control should increase the admission rate (lower the threshold T) to the secondary cache 300 to allow the admission of more of the pages with more caching value.

A person of ordinary skill in the art will appreciate that the embodiments of the present invention, disclosed herein, including the computer-implemented control 200 for controlling the population of secondary cache 300 of the system 100 of FIGS. 1 and 2, and the functionality provided therein, may be embodied as a system, method or computer program product. Accordingly, embodiments of the present invention may take the form of an entirely hardware embodiment, an entirely software embodiment (including firmware, resident software, micro-code, etc.) or a combination thereof, such as an embodiment combining software and hardware aspects that may all generally be referred to herein as a "circuit," "module" or "system." Furthermore, embodiments of the present invention may take the form of a computer program product embodied in one or more non-transitory computer readable medium(s) having computer readable program code embodied thereon.

Any combination of one or more non-transitory computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Those of skill in the art will understand that changes may be made with respect to the methods discussed above, including changes to the ordering of the steps. Further, those of skill in the art will understand that differing specific component arrangements may be employed than those illustrated herein.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A computer-implemented cache data storage system comprising:
   a secondary data storage cache; and
   a control for populating data into said secondary data storage cache, said control:
   determining a heat metric of candidate data to be inserted into said secondary data storage cache;
   rejecting candidate data provided to said secondary data storage cache whose heat metric is less than a heat metric threshold;

admitting to said secondary data storage cache, candidate data provided to said secondary data storage cache whose heat metric is equal to or greater than said heat metric threshold; and adjusting said heat metric threshold in accordance with caching efficiency of a present state of said secondary data storage cache, comprising:

maintaining a reference metric related to hits of data most recently inserted into said secondary data storage cache;

maintaining a reference metric related to hits of data most recently evicted from said secondary data storage cache; and comparing said reference metric of said most recently inserted data to said reference metric of said most recently evicted data;

if said most recently inserted reference metric is greater than said most recently evicted reference metric, decrementing said heat metric threshold; and if said most recently inserted reference metric is less than said most, recently evicted reference metric, incrementing said heat metric threshold.

2. The computer-implemented cache data storage system of claim 1, additionally comprising a first data storage cache; and wherein said heat metric is based on the heat of said data while said data was stored in said first data storage cache of said cache data storage system.

3. The computer-implemented cache data storage system of claim 2, wherein said data provided to said secondary data storage cache comprises data demoted from said first data storage cache.

4. The computer-implemented cache data storage system of claim 3, wherein said control additionally in said maintaining references steps:

lists said most recently inserted data in an MRI list and said most recently evicted data in an MRE list, and said reference metric comprises counting hits in said secondary data storage cache for said data listed in said MRI while said data is in said secondary data storage cache and hits for said data listed in said MRE after said data has been evicted from said secondary data storage cache.

5. The computer-implemented cache data storage system of claim 4, wherein said data comprise pages of data and said control determines said counts of hits for said heat metric on a per page basis, and determines said most recently inserted and said most recently evicted reference metrics for all of said pages listed respectively in said MRI and said MRE.

6. The computer-implemented cache data storage system of claim 1, wherein said control adjusting step additionally comprises, if said most recently inserted reference metric and said most recently evicted reference metric are substantially the same, said heat metric threshold is left unchanged.

7. The computer-implemented cache data storage system of claim 1, wherein said first data storage cache comprises a DRAM first cache providing data to said secondary cache and said secondary cache comprises a flash memory.

8. A computer program product for populating data into a secondary data storage cache of a computer-implemented cache data, storage system, said computer program product comprising non-transitory computer-usable storage medium having computer-usable program code embodied therein, said computer-usable program code comprising:

computer-usable program code to determine a heat metric of candidate data to be inserted into said secondary data storage cache;

computer-usable program code to reject candidate data provided to said secondary data storage cache whose heat metric is less than a heat metric threshold;

computer-usable program code to admit to said secondary data storage cache, candidate data provided to said secondary data storage cache whose heat metric is equal to or greater than said heat metric threshold; and computer-usable program code to adjust said heat metric threshold in accordance with caching efficiency of a present state of said secondary data storage cache, comprising computer-usable program code to:

maintain a reference metric related to hits of data most recently inserted into said secondary data storage cache;

maintain a reference metric related to hits of data most recently evicted from said secondary data storage cache;

compare said reference metric of said most recently inserted data to said reference metric of said most recently evicted data;

if said most recently inserted reference metric is greater than said most recently evicted reference metric, decrement said heat metric threshold; and if said most recently inserted reference metric is less than said most recently evicted reference metric, increment said heat metric threshold.

9. The computer program product of claim 8, wherein said cache data storage system additionally comprises a first data storage cache and wherein said heat metric is based on the heat of said data while said data was stored in said first data storage cache of said cache data storage system.

10. The computer program product of claim 9, wherein said data provided to said secondary data storage cache comprises data demoted from said first data storage cache.

11. The computer program product of claim 10, wherein said most recently inserted data is listed in an MRI list and said most recently evicted data is listed in an MRE list, and said reference metric comprises counting hits in said secondary data storage cache for said data listed in said MRI while said data is in said secondary data storage cache and hits for said data listed in said MRE after said data has been evicted from said secondary data storage cache.

12. The computer program product of claim 11, wherein said data comprise pages of data and counting hits for said heat metric is determined on a per page basis, and said most recently inserted and said most recently evicted reference metrics are determined for all of said pages listed respectively in said MRI and said MRE.

13. The computer program product of claim 8 wherein said computer-usable program code, in said adjusting step, if said most recently inserted reference metric and said most recently evicted reference metric are substantially the same, said heat metric threshold is left unchanged.

* * * * *